US010239027B2

(12) United States Patent
Senga et al.

(10) Patent No.: US 10,239,027 B2
(45) Date of Patent: Mar. 26, 2019

(54) DEVICE FOR PRODUCING LITHIUM SULFIDE, AND METHOD FOR PRODUCING LITHIUM SULFIDE

(71) Applicant: IDEMITSU KOSAN CO., LTD., Chiyoda-ku (JP)

(72) Inventors: Minoru Senga, Sodegaura (JP); Masahiro Iwahara, Ichihara (JP)

(73) Assignee: IDEMITSU KOSAN CO., LTD., Chiyoda-ku (JP)

(*) Notice: Subject to any disclaimer, the term of this patent is extended or adjusted under 35 U.S.C. 154(b) by 0 days.

(21) Appl. No.: 15/535,764

(22) PCT Filed: Dec. 16, 2015

(86) PCT No.: PCT/JP2015/006273
§ 371 (c)(1),
(2) Date: Jun. 14, 2017

(87) PCT Pub. No.: WO2016/098351
PCT Pub. Date: Jun. 23, 2016

(65) Prior Publication Data
US 2017/0368515 A1 Dec. 28, 2017

(30) Foreign Application Priority Data

Dec. 16, 2014 (JP) .................................. 2014-254395
Jun. 17, 2015 (JP) .................................. 2015-122168

(51) Int. Cl.
*B01F 7/16* (2006.01)
*C01B 17/22* (2006.01)
*C01D 15/02* (2006.01)
*C01D 15/00* (2006.01)
C01B 17/16 (2006.01)
H01M 10/052 (2010.01)
H01M 10/0562 (2010.01)

(52) U.S. Cl.
CPC ............... *B01F 7/16* (2013.01); *C01B 17/22* (2013.01); *C01D 15/00* (2013.01); *C01D 15/02* (2013.01); *C01B 17/16* (2013.01); *C01P 2006/12* (2013.01); *C01P 2006/80* (2013.01); *H01M 10/052* (2013.01); *H01M 10/0562* (2013.01); *H01M 2300/0068* (2013.01)

(58) Field of Classification Search
CPC . B01F 7/16; C01B 17/22; C01B 17/16; C01P 2006/80; C01P 2006/12; H01M 4/5815; H01M 10/052; C01D 15/02; C01D 15/00; B01J 8/00; B01J 19/00; B01J 19/0013; F28D 1/04
See application file for complete search history.

(56) References Cited

U.S. PATENT DOCUMENTS

| 2,745,823 | A | * | 5/1956 | Hewitt | B01F 15/06 422/138 |
|---|---|---|---|---|---|
| 4,126,666 | A | * | 11/1978 | Jacob | C01B 17/22 423/179.5 |
| 5,756,602 | A | * | 5/1998 | Hui | B01J 19/0013 526/344.2 |
| 5,958,281 | A | | 9/1999 | Takada et al. | |
| 6,503,473 | B1 | | 1/2003 | Akiba | |
| 2007/0196739 | A1 | | 8/2007 | Seino et al. | |
| 2011/0209578 | A1 | * | 9/2011 | Ara | B01J 4/002 75/345 |
| 2014/0037535 | A1 | | 2/2014 | Norihiko | |

FOREIGN PATENT DOCUMENTS

| DE | 100 08 499 A1 | 9/2000 | |
| EP | 0 802 159 A1 | 10/1997 | |
| JP | 55-84535 A | 6/1980 | |
| JP | 57-88014 A | 6/1982 | |
| JP | 01304002 A * | 12/1989 | ............... B01D 5/00 |
| JP | 9-278423 A | 10/1997 | |
| JP | 9-283156 A | 10/1997 | |
| JP | 2010-163356 A | 7/2010 | |
| JP | 2011-84438 A | 4/2011 | |
| JP | 2012-140261 A | 7/2012 | |
| JP | 4948659 B1 | 8/2012 | |
| JP | 2013-75816 A | 4/2013 | |
| JP | 2013-227180 A | 11/2013 | |
| JP | 2015-137183 A | 7/2015 | |
| JP | 2015-174787 A | 10/2015 | |
| WO | WO 2005/040039 A1 | 5/2005 | |

OTHER PUBLICATIONS

International Preliminary Report on Patentability Written Opinion dated Jun. 29, 2017 in PCT/JP2015/006273 (submitting English translation only).
International Search Report dated Mar. 9, 2019 in PCT/JP2015/006273.
Extended Search Report dated May 28, 2018 in European Patent Application No. 15869560.1.

* cited by examiner

Primary Examiner — Timothy C Vanoy
(74) Attorney, Agent, or Firm — Oblon, McClelland, Maier & Neustadt, L.L.P.

(57) ABSTRACT

An apparatus for producing lithium sulfide, including: a reaction container for allowing lithium hydroxide powder to be in contact with a hydrogen sulfide gas; a stirring blade inside the reaction container; a first heating apparatus that keeps the temperature of an inner wall of the reaction container that is in contact with the powder; and a second heating apparatus that keeps the temperature of an inner wall that is not in contact with the powder.

17 Claims, 1 Drawing Sheet

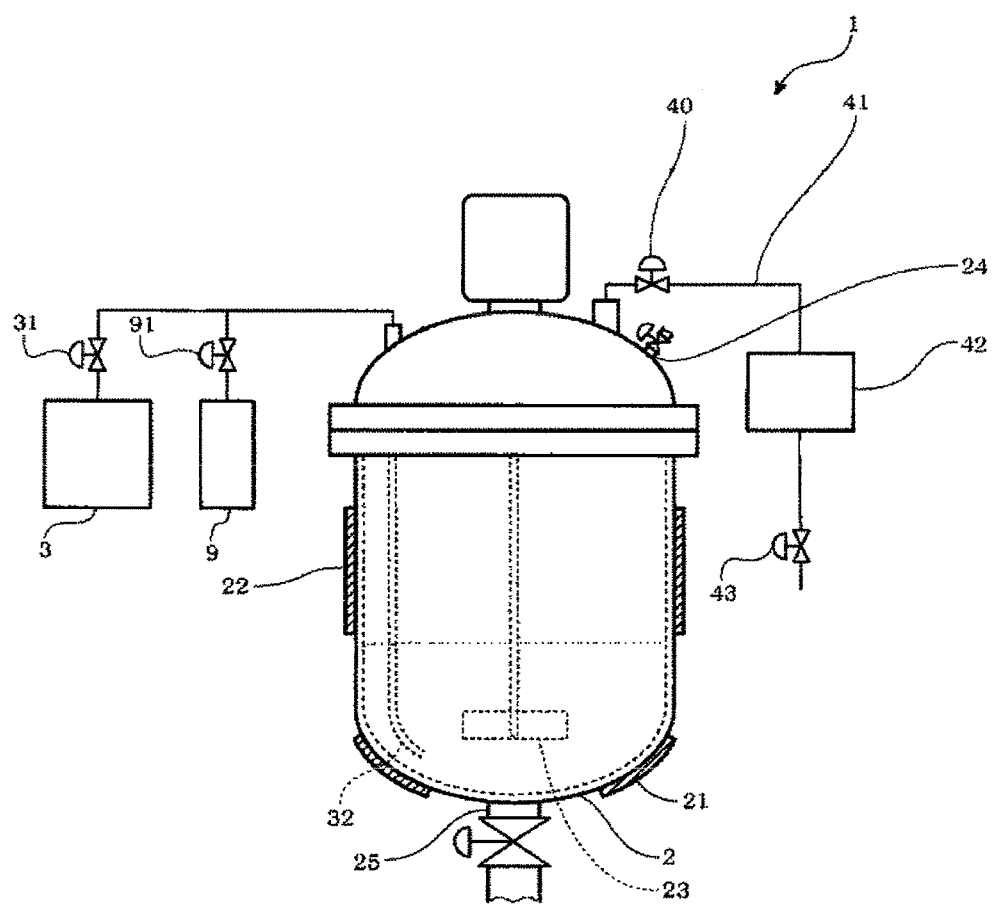

DEVICE FOR PRODUCING LITHIUM SULFIDE, AND METHOD FOR PRODUCING LITHIUM SULFIDE

TECHNICAL FIELD

The present invention relates to an apparatus for producing lithium sulfide and a method for producing lithium sulfide.

BACKGROUND ART

Lithium sulfide is used, for example, as a raw material for a sulfide solid electrolyte which is one type of electrolytes used in a lithium ion secondary battery.

Conventionally, as a method of synthesizing lithium sulfide, a method of reacting hydrogen sulfide with $Li_2CO_3$ or $Li_2SO_4$ is known (Patent Documents 1 to 3).

In addition, as a method for synthesizing lithium sulfide using LiOH as a raw material, a method in which a solvent or an aqueous solution is used (Patent Documents 4 to 6) and a method in which hydrogen sulfide is reacted with LiOH in the absence of a solvent (Patent Document 7) are known.

RELATED ART DOCUMENTS

Patent Documents

Patent Document 1: Japan Patent No. 4948659
Patent Document 2: JP-A-2013-075816
Patent Document 3: JP-A-2013-227180
Patent Document 4: JP-A-2010-163356
Patent Document 5: WO2005/040039
Patent Document 6: JP-A-2011-084438
Patent Document 7: JP-A-H09-278423

SUMMARY OF THE INVENTION

The methods disclosed in Patent Documents 1 to 3 have a defect that a temperature of 400° C. or higher is required for the reaction. The methods disclosed in Patent Documents 4 to 6 have a defect that the volumetric efficiency of the reaction chamber is low or a step of removing by distillation or recovering of a solvent or water is required. Further, the method disclosed in Patent Document 7 has a defect that aggregation of lithium hydroxide particles or adhesion of a formed product to the wall of a reaction apparatus, etc. tend to occur.

An object of the invention is to provide a production apparatus and a production method capable of producing high-purity lithium sulfide by using lithium hydroxide as a starting material in the absence of a solvent, without causing aggregation of lithium hydroxide particles or adhesion of a formed product to a reaction container.

As a result of extensive studies made by the inventors, they have found that, when lithium sulfide is produced by using lithium hydroxide as a starting material without using a solvent, aggregation of lithium hydroxide particles or adhesion of a formed product to a reaction container is caused by melting of particle surfaces by by-produced water. The inventors have also found that the adhesion mentioned above tends to occur when a relatively large amount of lithium hydroxide is used as a raw material, i.e. the production scale is increased.

According to the invention, the following apparatus for producing lithium sulfide or the like are provided.

1. An apparatus for producing lithium sulfide, comprising:
   a reaction container for allowing lithium hydroxide powder to be in contact with a hydrogen sulfide gas;
   a stirring blade inside the reaction container;
   a first heating apparatus that keeps the temperature of an inner wall of the reaction container that is in contact with the powder; and
   a second heating apparatus that keeps the temperature of an inner wall that is not in contact with the powder.
2. The apparatus for producing lithium sulfide according to 1, wherein the capacity of the reaction container is 0.1 liter (l) or more and 100 kiloliters (kl) or less.
3. The apparatus for producing lithium sulfide according to 1 or 2, wherein the stirring blade is provided at a position within 10 cm from a bottom surface of the reaction container.
4. The apparatus for producing lithium sulfide according to any one of 1 to 3, wherein a bottom surface part of the reaction container is rounded.
5. The apparatus for producing lithium sulfide according to any one of 1 to 4, wherein the stirring blade is an anchor blade, a Pfaudler blade, a helical blade, a maxblend blade or a disk-like blade.
6. A method for producing lithium sulfide, wherein
   in the absence of a solvent,
   lithium hydroxide is incorporated into a reaction container in an amount of 0.1 kg or more relative to 1 liter (l) of the capacity of the reaction container,
   the flow rate of hydrogen sulfide is 5 liters (l)/min or less relative to 1 kg of the lithium hydroxide, and
   the lithium hydroxide is reacted with the hydrogen sulfide while stirring the lithium hydroxide so as not to allow it to be stagnated.
7. The method for producing lithium sulfide according to 6, wherein the particle size of the lithium hydroxide is 0.1 mm or more and 1.5 mm or less.
8. The method for producing lithium sulfide according to 6 or 7, wherein the lithium hydroxide is anhydrous.
9. The method for producing lithium sulfide according to any one of 6 to 8, wherein the water content of the lithium hydroxide is 10 wt % or less.
10. The method for producing lithium sulfide according to any one of 6 to 9, wherein the amount of lithium hydroxide in the resulting lithium sulfide is 0.2 wt % or less.
11. The method for producing lithium sulfide according to any one of 6 to 10, wherein the purity of the resulting lithium sulfide is 98.0 wt % or more.
12. The method for producing lithium sulfide according to any one of 6 to 11, wherein the reaction is conducted for 1 hour or longer and 60 hours or shorter.
13. The method for producing lithium sulfide according to any one of 6 to 12, wherein the reaction is conducted for further 0.5 hours or longer and 10 hours or shorter after generation of water is no longer confirmed.
14. Lithium sulfide obtained by the production method according to any one of 6 to 13.

Further, according to the invention, the following method for producing lithium sulfide is provided.

1. A method for producing lithium sulfide, wherein, in the absence of a solvent, lithium hydroxide and hydrogen sulfide are reacted at a temperature of 140° C. or higher and 230° C. or lower.
2. The method for producing lithium sulfide according to 1, wherein the reaction temperature is 140° C. or higher and 220° C. or lower.
3. The method for producing lithium sulfide according to 1 or 2, wherein the particle size of the lithium hydroxide is 0.1 mm or more and 1.5 mm or less.

4. The method for producing lithium sulfide according to any one of 1 to 3, wherein the lithium hydroxide is an anhydride.
5. The method for producing lithium sulfide according to any one of 1 to 4, wherein the water content of the lithium hydroxide is 10 wt % or less.
6. The method for producing lithium sulfide according to any one of 1 to 5, wherein the reaction of the lithium hydroxide is conducted while stirring.
7. The method for producing lithium sulfide according to any one of 1 to 6, wherein the amount of lithium hydroxide in the obtained lithium sulfide is 0.2 wt % or less.
8. The method for producing lithium sulfide according to any one of 1 to 7, wherein the purity of the obtained lithium sulfide is 98.0 wt % or more.

According to the invention, it is possible to provide a production apparatus and a production method that can produce high-purity lithium sulfide by using lithium hydroxide as a starting material in the absence of a solvent and without causing aggregation of lithium hydroxide particles or adhesion of a formed product to a reaction container.

BRIEF DESCRIPTION OF THE DRAWINGS

The FIGURE is a schematic view for explaining an apparatus for producing lithium sulfide according to one embodiment of the invention.

MODE FOR CARRYING OUT THE INVENTION

[Apparatus for Producing Lithium Sulfide]

The apparatus for producing lithium sulfide of the invention comprises a reaction container for allowing lithium hydroxide powder to be in contact with a hydrogen sulfide gas and a stirring blade inside the reaction container. The apparatus is characterized by further comprising a first heating apparatus that keeps the temperature of an inner wall of the reaction container that is in contact with the powder and a second heating apparatus that keeps the temperature of an inner wall that is not in contact with the powder.

Meanwhile, the "powder" is mainly lithium hydroxide as a raw material and/or lithium sulfide as a formed product.

The FIGURE is a schematic view for explaining an apparatus for producing lithium sulfide according to one embodiment of the invention.

In the FIGURE, an apparatus 1 for producing lithium sulfide is provided with a reaction container 2, a first heating apparatus 21, a second heating apparatus 22, a stirring blade 23, a hydrogen sulfide cylinder 3, a discharge valve 40, a condenser 42 and a nitrogen cylinder 9, etc. In this apparatus 1 for producing lithium sulfide, lithium hydroxide powder and hydrogen sulfide gas are reacted without using a solvent such as a hydrocarbon-based organic solvent, whereby lithium sulfide is produced.

The reaction container 2 is a sealable container, in which lithium hydroxide is sealed. Meanwhile, the reaction container 2 may be a pressure container so as to allow a reaction to be conducted in a pressurized state.

The reaction container 2 has, in the vicinity of the bottom part thereof, the first heating apparatus 21. The first heating apparatus 21 is provided mainly in order to heat lithium hydroxide powder as the raw material and to keep it warm. Therefore, since the first heating apparatus 21 efficiently transfers heat to the powder, it is provided in the reaction container 2 at a part in which the powder and the container inner wall are in contact with each other (at a position lower than the interface of the powder phase and the gas phase in the reaction container 2). Specifically, it is preferred that it be provided on a bottom surface or in the vicinity thereof in the reaction container 2.

In the reaction container 2, to its body, a second heating apparatus 22 that is different from the first heating apparatus 21 is attached. The second heating apparatus 22 is provided not to heat lithium hydroxide powder or lithium sulfide powder formed, but mainly to prevent condensation of water on the inner wall of the reaction container 2. Therefore, it is provided at a position higher than an interface of the powder phase and the gas phase in the reaction container 2. Specifically, it is preferred that it be provided at a position higher than a part in the vicinity of a middle part or in a lid part of the reaction container 2. In the present embodiment, the heating apparatus 22 is attached to the body of the reaction container 2, but the invention is not limited thereto. The heating apparatus 22 may be provided in the lid part of the reaction container 2, or may be provided in both the body and the lid part.

No particular restrictions are imposed on the first heating apparatus 21 and the second heating apparatus 22, and any type can be used as long as it can heat the inner wall of the reaction container 2 or the powder to a prescribed temperature and can keep the heated state. For example, an electric heater, and a heating jacket that uses a heat medium such as an oil bath and water vapor can be given.

No particular restrictions are imposed on the lower limit of the capacity of the reaction container 2, but it is 100 milliliters (ml) or more or 300 milliliters (ml) or more, for example. The upper limit of the capacity of the reaction container is not particularly restricted, but it is 100 kiloliters (kl) or less, for example.

The present embodiment is effective when lithium hydroxide as a raw material is used in a large amount, i.e. 0.1 kg or more. As the size of the reaction container 2 becomes large, it becomes difficult to control the temperature of the container uniformly. For example, the temperature of the inner wall in the vicinity of the upper part of the reaction container 2 is lowered, thus causing water to be condensed. In the present embodiment, in addition to the first heating apparatus 21 for heating the powder, the second heating apparatus 22 for preventing condensation of water on the inner wall of the reaction container 2 is provided separately. Therefore, condensation of water can be prevented even if the size of the reaction container 2 becomes large. The capacity of the reaction container 2 is preferably 0.1 liter (l) or more and 100 kiloliters (kl) or less, for example, with 0.3 liter (l) or more and 50 kiloliters (kl) or less being particularly preferable.

In the reaction container 2, a stirring blade 23 for stirring the inside of the container is provided. In the present embodiment, the stirring blade 23 is a mono-axial stirring blade having a stirring blade at its lower stage. The shape or quantity of the stirring blade and the quantity or the like of the stirring shaft are not particularly restricted.

As the stirring blade 23, a common blade can be used. Specifically, stirring blades such as an anchor blade, a Pfaudler blade, a helical blade, a maxblend blade, a disk type blade or the like can be given.

In the reaction container 2, a supply port 24 for supplying lithium hydroxide is provided in the lid part, and an output port 25 for taking out lithium sulfide is provided in the bottom part.

In the reaction container 2, a pressure sensor, a temperature sensor, an interface meter or the like may be provided.

In the present embodiment, as means for blowing hydrogen sulfide to the inside of the reaction container 2, a hydrogen sulfide cylinder 3 is provided. The hydrogen sulfide cylinder 3 is connected with the reaction container 2 through a valve 31, pipes or the like. Inside the reaction container 2, the cylinder is connected with a pipe 32 that is intercommunicated with the pipe. The front end of this pipe 32 is positioned at a lower part of the reaction container 2, whereby hydrogen sulfide is blown to a part below the lithium hydroxide. As a result, the time for which hydrogen sulfide is brought into contact with lithium hydroxide is increased, and the time until completion of the reaction can be shortened.

One of the discharge valves 40 is connected with the lid part of the reaction container 2 through a pipe or the like, and the other is connected with the condenser 42 through a pipe 41 or the like. This discharge valves 40 function as a discharge means for discharging water formed as a reaction by-product during the reaction in the reaction container 2 to the outside of the reaction container 2.

In the reaction container 2, lithium sulfide is produced by the reaction represented by the following reaction formula (1) and the reaction formula (2):

$$LiOH+H_2S \rightarrow LiSH+H_2O \quad (1)$$

$$2LiSH \rightarrow Li_2S+H_2S \quad (2)$$

Therefore, a matter discharged from the discharge valve 40 contains water and hydrogen sulfide.

The discharge valve 40 is normally a pressure control valve or the like, and keeps the inside of the reaction container 2 at a prescribed pressure. According to need, in the apparatus 1 for producing lithium sulfide, a collection apparatus for collecting hydrogen sulfide may be provided. For example, a gas that is not liquefied in the condenser 42 may be collected by a collection apparatus.

The nitrogen cylinder 9 is connected with the reaction container 2 through the valve 91 and the pipe, etc., and within the reaction container 2, it is connected with the pipe 32 that is intercommunicated with the pipe. This nitrogen cylinder 9 supplies a nitrogen gas as an inert gas to the inside of the reaction container 2 at the completion stage of the reaction, etc.

Next, an operation or the like of the apparatus 1 for producing lithium sulfide will be explained.

In the apparatus 1 for producing lithium sulfide, first, the valve 91 and the discharge valve 40 are opened, and a nitrogen gas is injected from the nitrogen cylinder 9. The air or the like within the reaction container 2 is discharged, and then, the valve 91 is closed.

Subsequently, a prescribed amount of lithium hydroxide is incorporated into the reaction container 2 from the supply port 24.

In respect of the production efficiency, it is preferred that 0.1 kg or more of lithium hydroxide be incorporated relative to 1 liter (l) of the capacity of the reaction container. Lithium hydroxide is more preferably incorporated in an amount of 0.2 kg or more, with 0.3 kg or more being particularly preferable. Although no particular restrictions are imposed on the upper limit of the amount of lithium hydroxide to be incorporated, it is preferred that the amount of lithium hydroxide incorporated be 0.8 kg or less relative to 1 liter (l) of the capacity of the reaction container.

The bulk density of the lithium hydroxide powder is normally about 0.75 g/cm$^3$ to about 1.00 g/cm$^3$. Therefore, the amount of lithium sulfide incorporated relative to 1 liter (l) of the capacity of the reaction container is 0.2 liter (l) or more, 0.3 liter (l) or more or 0.4 liter (l) or more, for example. No particular restrictions are imposed on the upper limit. However, in respect of prevention of scattering of powder and lowering of stirring efficiency, it is preferred that the amount of lithium hydroxide be 0.8 liter (l) or less relative to 1 liter (l) of the capacity of the reaction container.

By operating the heating apparatuses 21 and 22 and the stirring blade 23, the lithium hydroxide and the inner wall of the reaction container are heated to a prescribed temperature, and at the same time, uniform stirring is conducted so as to prevent stagnation of lithium hydroxide in the reaction container.

By the second heating apparatus 22, the temperature of the inner wall of the reaction container 2 with which the raw material powder is not in contact is kept at 100° C. or higher. By this, condensation of by-produced water on the inner wall can be prevented. Although the upper limit of the inner wall of the reaction container 2 with which the raw material powder in the reaction container 2 is not in contact is not particularly restricted, 140° C. or less is preferable, for example.

It is possible to heat the lithium hydroxide in the reaction container 2 efficiently by the first heating apparatus 21. The heating temperature is preferably 140° C. or higher and 230° C. or lower.

In the present embodiment, since the two heating apparatuses 21 and 22 are provided separately, heating with an aim of preventing condensation of water and heating with an aim of heating raw materials can be independently controlled. As a result, it is possible to save energy used as compared with a case where heating is conducted by using one heating apparatus.

The stirring speed may be appropriately adjusted, but it may be 50 rpm or more and 2000 rpm or less, or 100 rpm or more and 1000 rpm or less, for example. In order to stir lithium hydroxide without causing stagnation of lithium hydroxide. It is preferred that the shape of the reaction container 2 be a shape without corners, e.g. a curved shape or a rounded shape.

It is preferred that the stirring blade be positioned as close as possible to the bottom of the reaction container 2. The distance between the stirring blade and the bottom of the reaction container is 10 cm or less, 5 cm or less, 2 cm or less and 1 cm or less, for example.

Then, the valve 31 is opened, and hydrogen sulfide is supplied to the inside of the reaction container 2, whereby the reaction is started. Within the reaction container 2, the reaction represented by the reaction formula (1) and the reaction represented by the reaction formula (2) proceed, whereby lithium sulfide is formed, and at the same time, water and hydrogen sulfide are generated.

Here, the powder and the reaction container 2 are heated to a prescribed temperature. Therefore, the generated water is not condensed within the reaction container, and is discharged from the reaction container 2 in the state of a gas together with hydrogen sulfide. This discharge is conducted through the discharge valve 40 and the pipe 41, etc. The pressure inside the reaction container 2 is controlled to a prescribed pressure by the discharge valve 40.

The blowing speed of hydrogen sulfide may be appropriately adjusted by the scale of a reaction system, reaction conditions or the like. In the invention, since a relatively large amount of lithium hydroxide can be incorporated into the reaction container 2, use efficiency of hydrogen sulfide is improved. As a result, the flow rate of hydrogen sulfide can be 5 liters (l)/min or less relative to 1 kg of lithium hydroxide incorporated. The flow rate of hydrogen sulfide is preferably 4 liters (l)/min or less, further preferably 3 liters (l)/min or less, particularly preferably 2 liters (l)/min or less relative to 1 kg of lithium hydroxide. The lower limit of the flow rate of hydrogen sulfide is 0.1 liter (l)/min, for example.

Water and hydrogen sulfide discharged are taken into the condenser 42, whereby water in the gaseous state becomes liquid (condensed). Most of the gaseous hydrogen sulfide is dissolved in water in the condenser 42.

The relationship between the amount of water generated and the reaction time is as follows. If the supply amount of hydrogen sulfide is allowed to be almost constant, with the start of the reaction is increased, the amount of water is increased by water generated by the reaction. Thereafter, the amount of water changes almost constantly, and then, it decreases with a decrease in the amount of lithium hydroxide as a raw material.

After generation of water is stopped, operation of the heating apparatuses 21 and 22 is stopped, and the valve 91 is opened. A nitrogen gas is blown to the reaction container 2, and hydrogen sulfide is discharged, whereby lithium sulfide formed is taken out from the output port 25.

In the present embodiment, since a reaction is conducted without using a solvent such as an organic solvent and water, it is possible to use the resulting lithium sulfide as it is without removing a solvent by distillation or collection.

In the above-mentioned embodiment, a vertical reaction container was used. However, the invention is not restricted to this reaction container. For example, a lateral apparatus such as a disk-type dryer can be used. In the case of a disk-type dryer, it is preferred that a second heating apparatus that keeps the temperature of the inner wall that is not in contact with the powder be provided in the vicinity of an output port of a gas.

[Method for Producing Lithium Sulfide]

The method for producing lithium sulfide of the invention is characterized in that, in the absence of a solvent, 0.1 kg or more of lithium hydroxide is incorporated relative to 1 liter of the capacity of the reaction container, and the flow rate of hydrogen sulfide is allowed to be 5 liters (l)/min or less relative to 1 kg of lithium hydroxide, and while stirring is conducted so as not to cause lithium hydroxide to be stagnated, lithium hydroxide and hydrogen sulfide are reacted.

Here, the "in the absence of a solvent" means that lithium hydroxide and hydrogen sulfide are reacted in the state where no solvent is present, not in a solvent. That is, it means that a reaction is conducted by allowing solid lithium hydroxide to be directly in contact with gaseous hydrogen sulfide.

The production method of the invention can be conducted by using the above-mentioned production apparatus of the invention. By this production apparatus, it is possible to prevent condensation of water by-produced at the time of producing lithium sulfide on the inner wall of the reaction container. As a result, aggregation of lithium hydroxide particles or adhesion of a formed product to the reaction container can be prevented, whereby, if a relatively large amount of lithium hydroxide is incorporated into the reaction container, high-purity lithium sulfide can be produced.

In respect of production efficiency, it is preferred that 0.2 kg or more of lithium hydroxide be incorporated relative to 1 liter (l) of the capacity of the reaction container. In particular, it is preferable to incorporate 0.3 kg or more of lithium hydroxide. No particular restrictions are imposed on the upper limit of the amount of lithium hydroxide incorporated, but preferably, lithium hydroxide is incorporated in an amount of 0.8 kg or less relative to 1 liter (l) of the capacity of the reaction container.

The bulk density of lithium hydroxide powder is normally about 0.75 g/cm$^3$ to about 1.00 g/cm$^3$. Therefore, the amount of lithium hydroxide relative to 1 liter (l) of the capacity of the reaction container is 0.2 liter (l) or more, 0.3 liter (l) or more or 0.4 liter (l) or more. Further, although no particular restrictions are imposed on the upper limit, in respect of prevention of scattering of powder and lowering of stirring efficiency, it is preferred that the amount of lithium hydroxide relative to 1 liter (l) of the capacity of the reaction container be 0.8 liter (l) or less.

In the production method of the invention, since a relatively large amount of lithium hydroxide can be incorporated in the reaction container, the use efficiency of hydrogen sulfide is improved. As a result, the flow rate of hydrogen sulfide can be 5 liters (l)/min or less relative to 1 kg of lithium hydroxide that is incorporated. The flow rate of hydrogen sulfide is preferably 4 liters (l)/min or less relative to 1 kg of lithium hydroxide. The flow rate is further preferably 3 liters (l)/min or less, and particularly preferably 2 liters (l)/min or less. In respect of productivity, the lower limit of the flow rate of hydrogen sulfide is preferably 0.1 liter (l)/min or more.

Hereinbelow, an explanation will be made on each raw material or reaction conditions.

[Lithium Hydroxide (LiOH)]

As for lithium hydroxide, a commercially-available lithium hydroxide can be used as it is. In the invention, as mentioned later, it is not necessary to use, as a raw material, lithium hydroxide that is pulverized in advance in fine particles. Therefore, it is not required to provide a step of finely pulverizing lithium hydroxide such as classification or grinding.

As mentioned above, no particular restrictions are imposed on lithium hydroxide. For example, it may be a commercial product having a particle size of 0.1 mm or more and 1.5 mm or less, or it may be a commercial product having a particle size exceeding 1.5 mm (e.g. 1.6 mm or more and 2.0 mm or less), for example.

The particle size is measured by using a laser diffraction type particle size distribution measuring apparatus (for example, Mastersizer 2000 manufactured by Malvern Instruments Ltd.).

Lithium hydroxide may be either a hydrate or an anhydride, but an anhydride is preferable. The amount of water as an impurity in lithium hydroxide is also not particularly limited, but is preferably 10 wt % or less, for example, 8 wt % or less, 5 wt % or less, or 3 wt % or less. The amount of water in lithium hydroxide is measured by an amount of decrease in weight when the sample is dried at 200° C. for 2 hours.

In the invention, the step of drying lithium hydroxide as the raw material may or may not be provided. As the step of drying, drying in an inert gas can be given, for example.

[Hydrogen Sulfide (H$_2$S)]

As for hydrogen sulfide, a commercial product can be used as it is.

Hydrogen sulfide may or may not be dehydrated. Since the resulting lithium sulfide may be adversely affected, the water content is preferably 50 ppm or less, more preferably 30 ppm or less. The lower limit of the water content is not particularly restricted, but is normally 0.1 ppm or more. The water content may be 0 ppm.

[Reaction Temperature]

The reaction temperature is preferably 140° C. or higher and 230° C. or lower. More preferably, the reaction temperature is 140° C. or higher and 220° C. or lower. For example, the reaction temperature is 150° C. or higher and 220° C. or lower, 150° C. or higher and 210° C. or lower, and 160° C. or higher and 200° C. or lower.

A reaction temperature within a range of 140° C. or higher and 230° C. or lower is preferable since aggregation of lithium hydroxide particles is hard to occur. For this reason, it is possible to allow a hydrogen sulfide gas to be diffused to the inside of lithium hydroxide, and hence to allow the reaction to proceed sufficiently, whereby highly pure lithium sulfide of which the amount of remaining lithium hydroxide has been reduced can be obtained. In addition, occurrence of adhesion or the like can be suppressed.

Further, as mentioned above, since a hydrogen sulfide gas can be diffused sufficiently to the inside of lithium hydroxide particles, it is not necessary to finely pulverize lithium hydroxide as a raw material by grinding, classification or the like in advance. Lithium hydroxide that is commercially available can be used as it is.

If the reaction is conducted within the above-mentioned temperature range, corrosiveness is also be decreased. As a result, smaller restrictions are imposed on the type of materials used in the reaction apparatus. For example, if the reaction temperature is 400° C. or higher, a stainless-made reaction apparatus may be corroded by hydrogen sulfide.

Further, by allowing the reaction temperature to be 230° C. or lower, which is within a range of the heat resistance temperature of various types of rubber, there is an advantage that designing of a shaft seal part is facilitated. Further, by allowing the reaction temperature to be 230° C. or less, there is an advantage that heating with a heat transfer oil is possible.

[Reaction]

Normally, the reaction is conducted in a reaction container into which no air is flown. Although no particular restrictions are imposed on the lower limit of the size of the reaction container, it is 100 milliliters (ml) or more, 300 milliliters (ml) or more, for example.

The upper limit of the size of the reaction container is not particularly restricted. The lower limit is 100 kiloliters (kl) or less, for example.

The invention is effective when a large amount (e.g. 0.1 kg or more) of lithium hydroxide as a raw material is used.

The reaction can be conducted in either a continuous way or a batch type way.

In the production method of the invention, lithium hydroxide and hydrogen sulfide are reacted with stirring while taking care not to allow lithium hydroxide to be stagnated. Specifically, the production apparatus of the invention described above can be used. As other apparatuses, any apparatus may be used as long as it can be applied within the reaction temperature range, can conduct stirring without causing lithium hydroxide to be stagnated, and can supply or discharge a gas. For example, in order to compensate the reaction heat, it is preferable to use a reaction apparatus for directly heating with a high-temperature hydrogen sulfide-rich gas (direct heating) or a reaction apparatus for indirectly heating by using a heat medium (indirect heating). Specifically, in the case of direct heating, a fluidized bed reactor and a rotary kiln are preferable. In the case of indirect heating, a disk type dryer having a large heat transfer area is preferable. As for the structure of a disk-type dryer, in order to increase the heat transfer speed and the effect of stirring and swinging, the disk may preferably be hollow and inclined relative to the shaft. By rotation of a disk, a self-cleaning effect of scraping off raw materials attached to a shaft and/or a casing can be exhibited.

As more specific examples of the disk-type dryer, a CD drier manufactured by Kurimoto Ltd., an inclined disk drier manufactured by Tsukishima Kikai Co., Ltd., a micron thermo-processor manufactured by Hosokawa Micron Group or the like can be given.

In the production method of the invention, a lithium sulfide gas is blown to a reaction container or the like into which lithium hydroxide is incorporated, whereby lithium hydroxide and hydrogen sulfide are reacted. No particular restrictions are imposed on the method for blowing hydrogen sulfide.

The stirring can be carried out using, for example, common blades. Specifically, stirring blades such as anchor blades, Pfaudler blades, helical blades, max blend blades, disk type blades, and the like can be given. The stirring speed may be appropriately adjusted, but is 50 rpm or more and 2000 rpm or less and 100 rpm or more and 1000 rpm or less, for example.

Water is by-produced by the reaction of lithium hydroxide and hydrogen sulfide. The by-produced water can be removed outside the reaction system by condensing water vapor evaporated from the reaction system by a condenser or the like. Here, by keeping the entire inner wall of the reaction container at 100° C. or higher, it is possible to prevent condensation of by-produced water on the inner wall of the reaction container. It is preferred that, among the parts of the reaction container, the temperature of a part that is in contact with lithium hydroxide be 140° C. or higher and 230° C. or lower, and the temperature of a part that is not in contact with lithium hydroxide be 100° C. or higher and 140° C. or lower.

As the reaction proceeds, lithium hydroxide as a raw material disappears from the reaction system, generation of water by the reaction stops. It is preferred that blowing of hydrogen sulfide continue until the water in the reaction system is evaporated to attain a dry state. If blowing of hydrogen sulfide stops before water is completely removed by distillation, hydrolysis of lithium sulfide may proceed.

After the dry state is attained, by continuing blowing of hydrogen sulfide for a certain period of time, it is possible to reduce the amount of LiOH in the resulting lithium sulfide, mentioned later. The time for which blowing is continued is preferably 0.5 hours or longer and 10 hours or shorter, further preferably 1 hour or longer and 4 hours or shorter, and is 2 hours or longer and 3 hours or shorter, for example. At this time, the flow rate of hydrogen sulfide may be the same as that before the dry state was attained, or may be smaller than that before the dry state was attained.

Thereafter, blowing of hydrogen sulfide is stopped and lithium sulfide is collected. In the invention, since a reaction is conducted without using a solvent, the resulting lithium sulfide can be used as it is without conducting removal by distillation or collection of the solvent.

The reaction time (time from starting blowing hydrogen sulfide to stopping of blowing) is normally 1 hour to 60 hours. For example, the reaction time is 2 hours to 30 hours, 6 hours to 20 hours, for example.

[Lithium Sulfide ($Li_2S$)]

According to the invention, since a reaction can sufficiently proceed, high-purity lithium sulfide in which the amount of lithium hydroxide as a raw material is decreased can be obtained. According to the invention, the purity of the resulting lithium sulfide can be 98.0 wt % or more, for example, 98.2 wt % or more.

Also, it is possible to allow the amount of lithium hydroxide in the resulting lithium sulfide be 0.4 wt % or less, for example, 0.2 wt % or less, for example, 0.1 wt % or less.

The purity of lithium sulfide and the amount of lithium hydroxide are measured by a potentiometric titration method.

The specific surface area of the resulting lithium sulfide measured by the BET method (gas adsorption method) is, for example, 1.0 m$^2$/g or more, 1.2 m$^2$/g or more and 1.5 m$^2$/g or more. In the BET method, a nitrogen gas may be used (nitrogen method) or a krypton gas may be used (krypton method). If the specific surface area is small, the specific surface area is normally measured by the krypton method. For example, it can be measured by means of AUTOSORB 6 (manufactured by Sysmex Corporation).

The pore volume of the obtained lithium sulfide is, for example, 0.002 ml/g or more. The pore volume can be measured by the same apparatus as that for measuring the specific surface area, and a value obtained by interpolating 0.99 from the measurement point at which the relative pressure P/P$_0$ is 0.99 or more can be used. The measurable lower unit of the apparatus is 0.001 ml/g. The pore volume of lithium sulfide is preferably 0.003 ml/g or more.

By using lithium sulfide obtained by the method of the invention, a sulfide-based solid electrolyte used in a lithium ion secondary battery or the like can be produced. A sulfide-based solid electrolyte can be used as a solid electrolyte layer of an all-solid lithium ion secondary battery or as a solid electrolyte to be mixed in a positive electrode mix or a negative electrode mix, etc. For example, by forming a positive electrode, a negative electrode and a layer composed of a solid electrolyte between the positive electrode and the negative electrode, an all-solid lithium ion battery is obtained.

EXAMPLES

Example 1

In a 500 milliliter (ml)-separable flask provided with an anchor stirring blade, 200 g of anhydrous lithium hydroxide dried in an inert gas atmosphere (manufactured by Honjyo Chemical Corporation, particle size range: 0.1 mm or more and 1.5 mm or less, water content: 1 wt % or less) was incorporated. The anhydrous lithium hydroxide was stirred at 200 rpm, and the temperature thereof was elevated in a nitrogen flow. The internal temperature (powder) was kept at 200° C. by using an oil bath. At the same time, the upper part of the separable flask was kept at 100° C. by means of a ribbon heater. The nitrogen gas was changed to a hydrogen sulfide gas (manufactured by Sumitomo Seika Chemicals Company Ltd.), and the flow rate thereof was 500 milliliters (ml)/min. While stirring by means of an anchor blade, anhydrous lithium sulfide and hydrogen sulfide were reacted.

The particle size range of anhydrous lithium sulfide and the water content were respectively measured by the above-mentioned method.

Water generated by the reaction was recovered after condensing by means of a condenser. After conducting a reaction for 6 hours, 144 milliliters (ml) of water was recovered. Further, the reaction was continued for 3 hours with the flow rate of hydrogen sulfide being kept at 500 milliliters (ml)/min. Generation of water was not observed. Further, adhesion of a formed product to a separable flask or the like was not observed.

Subsequently, with the temperature being kept at 200° C., the hydrogen sulfide gas was changed to a nitrogen gas, and the nitrogen gas was passed for 20 minutes, whereby the hydrogen sulfide gas in the flask was replaced by a nitrogen gas. The inner temperature was lowered in a state in which a nitrogen gas was circulated, whereby formed powder was recovered.

For the recovered formed product, purity of Li$_2$S and the amount of LiOH in Li$_2$S was measured, and a XRD measurement was conducted. Purity of Li$_2$S and the amount of LiOH in Li$_2$S were measured by potentiometric titration. The results are shown in Table 1. As a result of an XRD measurement, a peak pattern corresponding to Li$_2$S was confirmed.

The "detection limit" of the amount of LiOH is 0.1 wt %.

Example 2

Lithium sulfide was produced in the same manner as in Example 1, except that the flow rate of the hydrogen sulfide gas was changed from 500 milliliters (ml)/min to 200 milliliters (ml)/min and the total reaction time was changed to 16 hours. After the lapse of 14 hours, 140 milliliters (ml) of water was recovered. Thereafter, no distillation of water was observed for 2 hours. In addition, adhesion of a formed product to a separable flask or the like was not observed. The product was recovered and evaluated in the same manner as in Example 1. The results are shown in Table 1. Also, as a result of the XRD measurement, a peak pattern corresponding to Li$_2$S could be confirmed.

Example 3

Lithium sulfide was produced in the same manner as in Example 1, except that the reaction temperature was changed to 160° C. and the reaction time was changed to 20 hours. After the lapse of 14 hours, 140 milliliters (ml) of water was recovered. Thereafter, no distillation of water was observed for 6 hours. Adhesion of a formed product to a separable flask or the like was rarely observed.

The formed product was recovered and evaluation was conducted in the same manner as in Example 1. The results are shown in Table 1. As a result of the XRD measurement, a peak pattern corresponding to Li$_2$S was confirmed.

TABLE 1

|  | Reaction temperature (° C.) | H$_2$S flow rate (ml/min) | Li$_2$S purity (wt %) | LiOH amount (wt %) | Aggregation of formed powder | Adhesion of formed product to the wall surface of reaction container |
|---|---|---|---|---|---|---|
| Example 1 | 200 | 500 | 98.5 | Equal to or smaller than detection limit | Not occurred | Not occurred |
| Example 2 | 200 | 200 | 99 | Equal to or smaller than detection limit | Not occurred | Not occurred |

TABLE 1-continued

|  | Reaction temperature (° C.) | $H_2S$ flow rate (ml/min) | $Li_2S$ purity (wt %) | LiOH amount (wt %) | Aggregation of formed powder | Adhesion of formed product to the wall surface of reaction container |
|---|---|---|---|---|---|---|
| Example 3 | 160 | 500 | 99 | Equal to or smaller than detection limit | Not occurred | Not occurred |

Example 4

Lithium sulfide was produced in the same manner as in Example 1, except that the reaction temperature was changed to 220° C. and the reaction time was changed to 8 hours. 146 milliliters (ml) of water was recovered after the lapse of 5 hours. Thereafter, no distillation of water was observed for 3 hours. Adhesion of a formed product to a separable flask or the like was rarely observed.

The formed product was recovered and evaluation was conducted in the same manner as in Example 1. The results are shown in Table 2. As a result of the XRD measurement, a peak pattern corresponding to $Li_2S$ was confirmed.

Example 5

Lithium sulfide was produced in the same manner as in Example 1, except that the reaction temperature was changed to 180° C. and the reaction time was changed to 11 hours. 143 milliliters (ml) of water was recovered after the lapse of 7 hours. Thereafter, no distillation of water was observed for 4 hours. Adhesion of a formed product to a separable flask or the like was rarely observed.

The formed product was recovered and evaluation was conducted in the same manner as in Example 1. The results are shown in Table 2. As a result of the XRD measurement, a peak pattern corresponding to $Li_2S$ was confirmed.

Example 6

Lithium sulfide was produced in the same manner as in Example 1, except that the reaction temperature was changed to 140° C. and the reaction time was changed to 20 hours. 140 milliliters (ml) of water was recovered after the lapse of 18 hours. Thereafter, no distillation of water was observed for 2 hours. Adhesion of a formed product to a separable flask or the like was rarely observed.

The formed product was recovered and evaluation was conducted in the same manner as in Example 1. The results are shown in Table 2. As a result of the XRD measurement, a peak pattern corresponding to $Li_2S$ was confirmed.

Regarding the fact that the amount of LiOH was not equal to or smaller than a detection limit in Example 6, the following reasons are considered. The reaction speed was slow since the reaction temperature was lower as compared with Examples 1 to 5, and the period of time from a point at which no distillation of water was observed to a point at which the reaction was completed, i.e. the period of time until the amount of LiOH became equal to or smaller than a detection limit, was as short as 2 hours.

TABLE 2

|  | Reaction temperature (° C.) | $H_2S$ flow rate (ml/min) | $Li_2S$ purity (wt %) | LiOH amount (wt %) | Aggregation of formed powder | Adhesion of formed product to the wall surface of reaction container |
|---|---|---|---|---|---|---|
| Example 4 | 220 | 500 | 99.1 | Equal to or smaller than detection limit | Not occurred | Not occurred |
| Example 5 | 180 | 500 | 99.4 | Equal to or smaller than detection limit | Not occurred | Not occurred |
| Example 6 | 140 | 500 | 98.9 | 0.35 | Not occurred | Not occurred |

INDUSTRIAL APPLICABILITY

The apparatus for producing lithium sulfide of the invention can be preferably used as an apparatus for producing high-purity lithium sulfide.

The lithium sulfide obtained by the production method of the invention can be used as a raw material of a sulfide-based solid electrolyte used in a lithium ion secondary battery or the like.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The specification of Japanese application(s) on the basis of which the present application claims Paris convention priority are incorporated herein by reference in its entirety.

The invention claimed is:

1. An apparatus for producing lithium sulfide, comprising:
a reaction container for allowing lithium hydroxide powder to be in contact with a hydrogen sulfide gas;
a stirring blade inside the reaction container;
a first heating apparatus that keeps a temperature of an inner wall of the reaction container that is in contact with the lithium hydroxide powder; and
a second heating apparatus that keeps a temperature of an inner wall of the reaction container that is not in contact with the lithium hydroxide powder, wherein a capacity of the reaction container is 0.1 liter or more and 100 kiloliters or less.

2. The apparatus for producing lithium sulfide according to claim 1, wherein the stirring blade is provided at a position within 10 cm from a bottom surface of the reaction container.

3. The apparatus for producing lithium sulfide according to claim 1, wherein a bottom surface part of the reaction container is rounded.

4. The apparatus for producing lithium sulfide according to claim 1,
wherein the stirring blade is an anchor blade, a Pfaudler blade, a helical blade, a maxblend blade or a disk-like blade.

5. The apparatus for producing lithium sulfide according to claim 1, wherein the first heating apparatus keeps the temperature of the inner wall of the reaction container that is in contact with the powder at a reaction temperature of the powder and hydrogen sulfide gas; and
the second heating apparatus keeps the temperature of the inner wall of the reaction container that is not in contact with the powder at a temperature to prevent condensation of water.

6. The apparatus for producing lithium sulfide according to claim 1, wherein the first heating apparatus keeps the temperature of the inner wall of the reaction container that is in contact with the powder at 140° C. or higher and 230° C. or lower; and
the second heating apparatus keeps the temperature of the inner wall of the reaction container that is not in contact with the powder at 100° C. or higher.

7. A method for producing lithium sulfide, the method comprising:
incorporating lithium hydroxide into a reaction container in an amount of 0.1 kg or more relative to 1 liter of a capacity of the reaction container,
introducing hydrogen sulfide to the reaction container at a flow rate of 5 liters; min or less relative to 1 kg of the lithium hydroxide, and
reacting the lithium hydroxide with the hydrogen sulfide while stirring the lithium hydroxide so as not to allow it to be stagnated,
wherein the method is performed in an absence of a solvent.

8. The method for producing lithium sulfide according to claim 7, wherein a particle size of the lithium hydroxide is 0.1 mm or more and 1.5 mm or less.

9. The method for producing lithium sulfide according to claim 7, wherein the lithium hydroxide is anhydrous.

10. The method for producing lithium sulfide according to claim 7, wherein a water content of the lithium hydroxide is 10 wt % or less.

11. The method for producing lithium sulfide according to claim 7, wherein an amount of lithium hydroxide in a resulting lithium sulfide is 0.2 wt % or less.

12. The method for producing lithium sulfide according to claim 7, wherein a purity of a resulting lithium sulfide is 98.0 wt % or more.

13. The method for producing lithium sulfide according to claim 7, wherein the reacting is conducted for 1 hour or longer and 60 hours or shorter.

14. The method for producing lithium sulfide according to claim 7, wherein the reacting is conducted for additional 0.5 hours or longer and 10 hours or shorter after generation of water is no longer confirmed.

15. The method for producing lithium sulfide according to claim 7, wherein the inner wall of the reaction container that is not in contact with the lithium hydroxide is heated to a temperature to prevent condensation of water, while heating the inner wall of the reaction container in contact with the lithium hydroxide to a reaction temperature of the lithium hydroxide and hydrogen sulfide gas.

16. The method for producing lithium sulfide according to claim 7, wherein the inner wall of the reaction container that is not in contact with the lithium hydroxide is heated to 100° C. or higher, while heating the inner wall of the reaction container in contact with the lithium hydroxide to 140° C. or higher and 230° C. or lower.

17. Lithium sulfide obtained by the method according to claim 7.

* * * * *

UNITED STATES PATENT AND TRADEMARK OFFICE
CERTIFICATE OF CORRECTION

PATENT NO. : 10,239,027 B2
APPLICATION NO. : 15/535764
DATED : March 26, 2019
INVENTOR(S) : Minoru Senga et al.

It is certified that error appears in the above-identified patent and that said Letters Patent is hereby corrected as shown below:

In the Specification

Column 15, Line 38, "liters; min" should read --liters/min--;

Column 16, Line 11, "wt %" should read --wt%--;

Column 16, Line 14, "wt %" should read --wt%--;

Column 16, Line 17, "wt %" should read --wt%--.

Signed and Sealed this
Fourteenth Day of April, 2020

Andrei Iancu
*Director of the United States Patent and Trademark Office*